United States Patent [19]

Koppensteiner et al.

[11] 3,874,869
[45] Apr. 1, 1975

[54] ANTIMICROBIAL AGENTS FOR WATER CONSERVATION

[75] Inventors: Günter Koppensteiner, Hilden, Rhineland; Hans-Werner Eckert, Dusseldorf; Volker Wehle, Hilden, all of Germany

[73] Assignee: Hendel & Cie GmbH, Dusseldorf, Germany

[22] Filed: Apr. 20, 1973

[21] Appl. No.: 352,941

[30] Foreign Application Priority Data
Apr. 24, 1972 Germany............................ 2220026
Mar. 22, 1973 Germany............................ 2314221

[52] U.S. Cl........................ 71/67, 111/86, 111/113, 260/561 A, 424/204, 424/222, 424/313, 424/320, 210/64
[51] Int. Cl. ............................ A01n 9/00, A01n 9/02
[58] Field of Search ............... 71/67, 85; 260/561 A

[56] References Cited
UNITED STATES PATENTS

| | | | |
|---|---|---|---|
| 2,526,078 | 10/1950 | Kropa et al. ........................... | 260/78 |
| 2,689,239 | 9/1954 | Melamed .............................. | 260/69 |
| 2,720,508 | 10/1955 | Melamed ........................... | 260/77.5 |
| 2,756,257 | 7/1956 | Stamatoff....................... | 260/561 A |
| 3,539,684 | 11/1970 | Hoover.................................. | 71/67 |

OTHER PUBLICATIONS

Hueck et al., "Bacteriostatic, Fungistatic, and Algistatic, etc;" (1965) App. Microbiology, 14, pp. 308–319 (1966).
Repetun, "Maximum Permissible Concentrations etc.;" (1971), CA 77 No. 100, 147m. (1972).
Shpitalnyi et al., "Opening of the King of E–Capcolactan etc.;" (1953), CA 48, p. 11329 (1954).

*Primary Examiner*—Glennon H. Hollrah
*Attorney, Agent, or Firm*—Hammond & Littell

[57] ABSTRACT

A process for the prevention of the growth of microorganisms, especially in industrial water, comprises contacting these microorganisms with an effective antimicrobial amount of a reaction product of ε-caprolactam and an N-alkylalkylene diamine with the reaction being carried out in the liquid phase for 3 to 20 hours at a temperature above 180°C. The process further comprises incorporating into said industrial water an effective amount of a sequestering agent comprising a water-soluble phosphonic acid which forms a complex with a divalent metal, a water-soluble salt of the acid and the mixtures thereof, with the weight ratio of sequestering agent to reaction product being 1:10 to 10:1.

16 Claims, No Drawings

ANTIMICROBIAL AGENTS FOR WATER CONSERVATION

Industrial and other service waters, such as the water in swimming pools, cooling cycle water, wash water in air conditioning plants, etc. will readily support the growth of microorganisms. The undisturbed mass development of these microorganisms creates coatings and films such that the heat exchange capacity is reduced in refrigeration plants, that they clog or at least greatly reduce the coolant flow rate, that they cause corrosion to appear, and that they form unpleasant odors. The most detrimental microorganisms in industrial and other service waters are algae, slime-forming bacteria, and sulfate-reducing bacteria.

There have been many previous attempts to develop methods and products which prevent the growth of these microorganisms in the various industrial waters. These efforts have led to the use of a number of substances, however, without the problem having been satisfactorily solved in every respect. Among the products that are perhaps most frequently used in practice as biocides in industrial waters and swimming pools are the quarternary ammonium compounds. In low concentrations these compounds show an unsatisfactory activity against typical gramnegative water occurring bacteria and sulfate-reducing bacteria. Their use in concentrations that could perhaps lead to satisfactory antimicrobial activity is generally prevented by their great tendency to foam formation. It has therefore become necessary to find substances which are highly effective for the preservation of industrial waters and other service waters, and which have, on the other hand, no adverse side effects.

OBJECTS OF THE INVENTION

It is an object of the present invention to provide a process for the prevention of the growth of microorganisms selected form the group consisting of gram-positive bacteria, gram-negative bacteria, fungi and algae which consists essentially of contacting said microorganisms with an amount effective to prevent the growth of said microorganisms of a reaction product of $\epsilon$-caprolactam with an N-alkylalkylene diamine of the formula

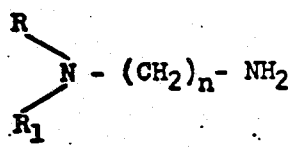

wherein R is selected from the group consisting of alkyl of 10 to 18 carbon atoms, hydroxyalkyl of 10 to 18 carbon atoms, alkenyl of 10 to 18 carbon atoms, hydroxyalkenyl of 10 to 18 carbon atoms, alkadienyl of 10 to 18 carbon atoms, alkatrienyl of 10 to 18 carbon atoms, and mixtures of alkyl derived from fatty acid mixtures of 10 to 18 carbon atoms, $R_1$ is a member selected from the group consisting of hydrogen and alkyl of 1 to 4 carbon atoms, and n is an integer from 2 to 6, with the molar ratio of N-alkylalkylene diamine to $\epsilon$-caprolactam ranging from 1:1 to 1:10, said reaction being carried out for 3 to 20 hours in the liquid phase at temperatures above 180°C.

It is a further object of the present invention to provide a process for the prevention of the growth of microorganisms in industrial water which comprises incorporating into said industrial water an atimicrobial effective amount of the above reaction product of $\epsilon$-caprolactam with an N-alkylalkylene diamine of the formula

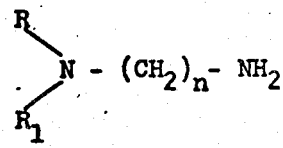

with the molar ratio of N-alkylalkylene diamine to $\epsilon$-caprolactam ranging from 1:1 to 1:10 and said reaction being carried out for 3 to 20 hours in the liquid phase at a temperature above 180°C.

It is a further object of the present invention to provide an antimicrobial and algicidal composition for preventing the growth in industrial waters of microorganisms selected from the group consisting of gram-positive bacteria, gram-negative bacteria, fungi and algae consisting of (A) a reaction product of $\epsilon$-caprolactam with an N-alkylalkylene diamine of the formula

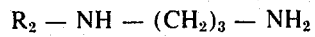

$$R_2 - NH - (CH_2)_3 - NH_2$$

wherein $R_2$ is selected form the group consisting of alkyl of 12 to 14 carbon atoms, hydroxyalkyl of 12 to 14 carbon atoms, alkenyl of 12 to 14 carbon atoms, hydroxyalkenyl of 12 to 14 carbon atoms, alkadienyl of 12 to 14 carbon atoms, alkatrienyl of 12 to 14 carbon atoms, and mixtures of alkyl derived from fatty acid mixtures of 12 to 14 carbon atoms, with the molar ratio of N-alkylalkylene diamine to $\epsilon$-caprolactam ranging from 1:1 to 1:3, and said reaction being carried out for 3 to 20 hours in the liquid phase at a temperature above 180°C; and (B) a sequestering agent selected from the group consisting of at least one water-soluble phosphonic acid which forms a complex with a divalent metal, a water-soluble salt of said acid and the mixtures thereof, with the weight ratio of said sequestering agents to said reaction product being 1:10 to 10:1.

These and other objects of the present invention will become apparent as the description thereof proceeds.

DESCRIPTION OF THE INVENTION

The present invention concerns antimicrobial agents for preserving industrial and service water based on the reaction products of $\epsilon$-caprolactam and N-alkylalkylene diamines.

The present invention provides more particularly that antimicrobial agents are to be used for the preservation of industrial waters and service based upon incorporating into these waters an effective amount of the reaction product of $\epsilon$-caprolactam with N-alkylalkylene diamines of the formula

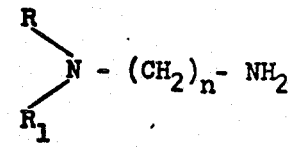

where R denotes a straight- or branch-chained, saturated or unsaturated aliphatic hydrocarbon radical 10 to 18 carbon atoms, $R_1$ denotes hydrogen or an aliphatic hydrocarbon radical with 1 to 4 carbon atoms, and $n$ an integral number from 2 to 6, preferably 3, and where the molar ratio of the reaction partners N-alkylalkylene diamine : ε-caprolactam is 1:1 to 1:10, and the reaction is carried out in the liquid phase for 3 to 20 hours at temperatures above 180°C, preferably at about 250°C.

The present invention is therefore directed to a process for the prevention of the growth of microorganisms selected from the group consisting of gram-positive bacteria, gram-negative bacteria, fungi and algae which consists essentially of contacting said microorganisms with an amount effective to prevent the growth of said microorganisms of a reaction product of ε-caprolactam with an N-alkylalkylene diamine of the formula

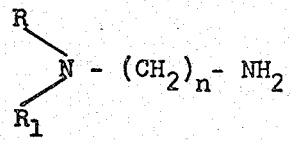

wherein R is selected from the group consisting of alkyl of 10 to 18 carbon atoms, hydroxyalkyl of 10 to 18 carbon atoms, alkenyl of 10 to 18 carbon atoms, hydroxyalkenyl of 10 to 18 carbon atoms, alkadienyl of 10 to 18 carbon atoms, alkatrienyl of 10 to 18 carbon atoms, and mixtures of alkyl derived from fatty acid mixtures of 10 to 18 carbon atoms, $R_1$ is a member selected from the group consisting of hydrogen and alkyl of 1 to 4 carbon atoms, and n is an integer from 2 to 6, with the molar ratio of N-alkylalkylene diamine to ε-caprolactam ranging from 1:1 to 1:10; said reaction being carried out for 3 to 20 hours in the liquid phase at temperatures above 180°C.

The present invention is further directed to a process for the prevention of the growth of microorganisms in industrial water which comprises incorporating into said industrial water an antimicrobial effective amount of the above reaction product of ε-caprolactam with an N-alkylalkylene diamine of the formula

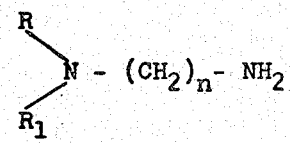

with the molar ratio of N-alkylalkylene diamine to ε-caprolactam ranging from 1:1 to 1:10 and said reaction being carried out for 3 to 20 hours in the liquid phase at a temperature above 180°C.

The present invention is further directed to an antimicrobial and algicidal composition for preventing the growth in industrial waters of microorganisms selected from the group consisting of gram-positive bacteria, gram-negative bacteria, fungi and algae consisting of (A) a reaction product of ε-caprolactam with an N-alkylalkylene diamine of the formula

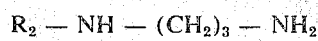

wherein $R_2$ is selected from the group consisting of alkyl of 12 to 14 carbon atoms, hydroxyalkyl of 12 to 14 carbon atoms, alkenyl of 12 to 14 carbon atoms, hydroxyalkenyl of 12 to 14 carbon atoms, alkadienyl of 12 to 14 carbon atoms, alkatrienyl of 12 to 14 carbon atoms, and mixtures of alkyl derived from fatty acid mixtures of 12 to 14 carbon atoms, with the molar ratio of N-alkylalkylene diamine to ε-caprolactam ranging from 1:1 to 1:3, and said reaction being carried out for 3 to 20 hours in the liquid phase at a temperature above 180°C; and (B) a sequestering agent selected from the group consisting of at least one water-soluble phosphonic acid which forms a complex with a divalent metal, a water-soluble salt of said acid and the mixtures thereof, with the weight of said sequestering agent to said reaction product being 1:10 to 10:1.

The production of the products forming the basis of the antimicrobial agents according to the invention is preferably effected in the melt by heating a mixture, defined by the desired ratio of the reaction partners, of predried ε-caprolactam and freshly distilled N-alkylalkylene diamine to about 250°C, using reaction times between 3 to 20 hours. The reaction products are obtained as water-clear, thinly liquid melts which solidify on cooling to white solid substances which are difficultly soluble in water and organic solvents.

The reaction can also be effected, however, in the presence of high-boiling nonreactive solvents.

The reaction products can be considered on the basis of their production method and the analogy to the reaction products of ε-caprolactam and alkyl amines, as described in German patent application P 19 20 492.3, as oligomer-mixtures of the probable structural formula

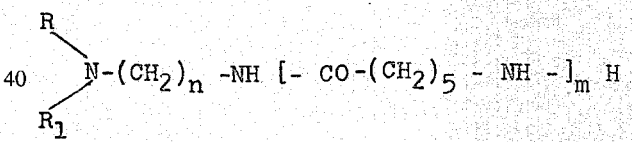

where R, $R_1$ and $n$ have the above defined meaning and $m$ is an integer from 1 to 10. However the reaction products of the present invention are not to be deemed limited to this structural formula.

The N-alkylalkylene diamines used as starting materials represent products that are known in the literature. They can be obtained, for example, by selective alkylation of corresponding diamines or by the reaction of alkyl amines with acrylonitrile and subsequent hydrogenation (Houben-Weyl, Methoden der Organischen Chemie, 4th ed. vol. 11/1 p. 564; French patent No. 1,351,793). Of particular importance as starting amines are the N-alkyl-1,3-propylene diamines, since the reaction products with ε-caprolactam produced from them have particularly valuable properties, and these amines are, on the other hand, readily available. These readily available diamines are substantially those whose alkyl radicals are preferably straight-chained, saturated or unsaturated, and whose alkyl radicals originate from the corresponding fatty acids, for example alkanoic acids of 10 to 18 carbon atoms such as lauric acid, myristic acid, palmitic acid and stearic acid; for example hydroxyalkanoic acids of 10 to 18 carbon atoms such as hydroxystearic acid; alkenoic acids of 10 to 18 carbon atoms such as oleic acid and palmitic-oleic acid; hydroxyalkenoic acids of 10 to 18 carbon atoms as ricinoleic acid; alkadienoic acids of 10 to 18 carbon atoms such as linoleic acid; alkatrienoic acids of 10 to 18 carbon atoms such as linolenic acid; and mixtures of fatty acids of 10 to 18 carbon atoms, as they are obtained, for example from coconut fatty acid, tallow fatty acid, soybean oil, linseed oil, palm oil, rape seed oil, colza oil, fish and whale oils, as well as their hydrogenation products.

As far as the antimicrobial action is concerned, those reaction products which have proved particularly effective are those derived from N-alkylalkylene diamines of the above-mentioned formula, whose alkyl radical R contains 12 to 14 carbon atoms and wherein $R_1$ is hydrogen. Furthermore it was found advantageous, as far as the antimicrobial action is concerned, if the molar ratio of N-alkylalkylene diamine to ε-caprolactam in these reaction products is 1:1 to 1:10, preferably 1:1 to 1:5, and especially 1:1 to 1:3. As mentioned above, those reaction products which are of particular importance are those derived from N-alkylalkylene diamines, where $n = 3$; that is, from N-alkyl-1,3-propylene diamines.

Suitable examples of reaction products according to the invention include the reaction products of ε-caprolactam with the following N-alkylalkylene diamines in the indicated molar ratio: N-dodecyl-1,2-ethylene diamine 5:1, N-coconut fatty alkyl-1,2-ethylene diamine 3:1, N-dodecyl-N-ethyl-1,3-propylene diamine 3:1, N-decyl-1,4-butylene diamine 2:1, N-tallow fatty alkyl-1,4-butylene diamine 10:1, N-dodecyl-1,5-pentylene diamine 5:1, N-tetradecyl-1,6-hexylene diamine 3:1, and N-hexadecyl-1,6-hexylene diamine 4:1. Preferred are those with N-decyl-1,3-propylene diamine 3:1, N-dodecyl-1,3-propylene diamine 1:1, N-dodecyl-1,3-propylene diamine 2:1, N-dodecyl-1,3-propylene diamine 2:1, N-dodecyl-1,3-propylene diamine 4:1, N-dodecyl-1,3-propylene diamine 5:1, N-coconut fatty alkyl-1,3-propylene diamine 3:1, N-coconut fatty alkyl-1,3-propylene diamine 1:1, N-coconut fatty alkyl-1,3-propylene diamine 2:1, N-tetradecyl-1,3-propylene diamine 3:1, N-hexadecyl-1,3-propylene diamine 3:1, N-octadecyl-1,3-propylene diamine 3:1, N-tallow fatty alkyl-1,3-propylene diamine 3:1, and N-hardened tallow fatty alkyl-1,3-propylene diamine 3:1.

The products to be used as antimicrobial agents for the preservation of water can consist solely of the reaction products of ε-caprolactam with N-alkylalkylene diamines; but they can also contain other additives, for example, watersofteners, rust preventatives, sequestering agents, and others.

The amount of the antimicrobial and algicidal agents in the compositions to be used in accordance with the invention may vary from 0.1 to 10% by weight, preferably from 0.5 to 5% by weight, and especially from 0.1 to 2% by weight.

The amount of the antimicrobial, antifungal and algicidal reaction products of the invention required for inhibiting the growth of the microorganisms varies from 0.1 to 500 parts per million.

The amount of reaction product of ε-caprolactam with N-alkylalkylene diamine added to industrial water to be treated ranges from 0.5 to 50 mgm/liter of industrial water, preferably from 1 to 10 mgm/liter.

Suitable examples of sequestering agents include inorganic sequestering agents, such as polymeric phosphates, for example, di- or tetra-alkali metal pyrophosphates, alkali metal tripolyphosphates and alkali metal metaphosphates; or organic sequestering agents, for example, nitrilotriacetic acid, ethylene-diamine tetraacetic acid, N-hydroxyethyl-ethylenediamine triacetic acid and polyalkylene-polyamine-N-polycarboxylic acids.

Preferred however are the phosphonic acids which form complexes with divalent metals; and suitable exampls of compounds to be utilized according to the present invention include those having the following formulae:

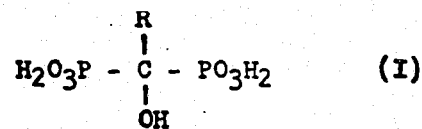

in which R' represents phenyl or alkyl of 1 to 5 carbon atoms;

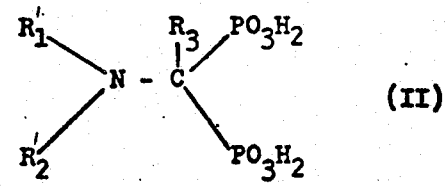

in which $R'_1$ and $R'_2$ each represent hydrogen or alkyl of 1 to 4 carbon atoms, $R_3$ represents hydrogen, alkyl of 1 to 4 carbon atoms, or phenyl;

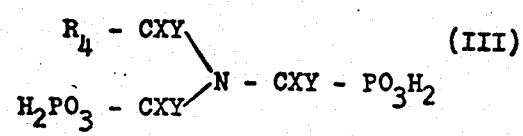

in which X and Y each represent hydrogen or an alkyl of 1 to 4 carbon atoms, $R_4$ represents —$PO_3H_2$ or a group of the formula:

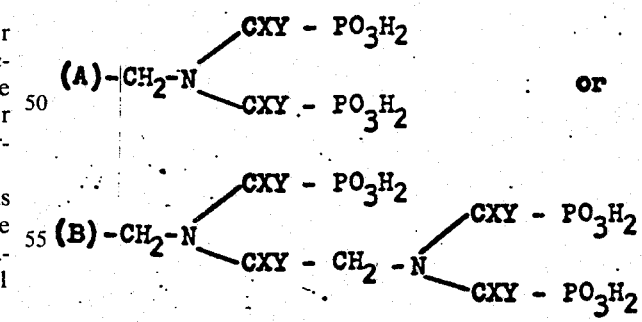

in which X and Y each have the above-defined meaning; and

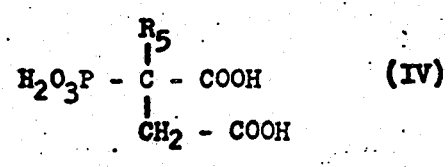

in which $R_5$ represents hydrogen, methyl or —CH$_2$—CH$_2$—COOH.

Suitable examples of 1-hydroxyalkane-1,1-diphosphonic acids of formula I which maby be used are 1-hydroxypropane-1,1-diphosphonic acid, 1-hydroxybutane-1,1-diphosphonic acid, 1-hydroxypentane-1,1-diphosphonic acid, 1-hydroxyhexane-1,1-diphosphonic acid, as well as 1-hydroxy-1-phenylmethane-1,1-diphosphonic acid and preferably 1-hydroxyethane-1,1-diphosphonic acid.

Suitable examples of 1-aminoalkane-1,1-diphosphonic acids of formula II are 1-aminoethane-1,1-diphosphonic acid, 1-amino-1-phenylmethane-1,1-diphosphonic acid, 1-dimethylaminoethane-1,1-diphosphonic acid, 1-dimethylaminobutane-1,1-diphosphonic acid, 1-diethylaminomethane-1,1-diphosphonic acid, 1-propyl-aminomethane-1,1-diphosphonic acid, and 1-butyl-aminomethane-1,1-diphosphonic acid.

Suitable examples of aminopolymethylene phosphonic acids of the formula III include aminotrimethylenephosphonic acid, ethylenediaminotetramethylenephosphonic acid, diethylenetriaminopentamethylenephosphonic acid, aminotri(2-propylene-2-phosphonic acid).

Suitable examples of phosphono succinic acids of formula IV include phosphonosuccinic acid, 1-phosphono-1-methylsuccinic acid and 2-phosphonobutane-1,2,4-tricarboxylic acid.

Instead of the phosphonic acids mentioned above, their water-soluble salts may slso be used, such as alkali metal salts especially the sodium salt or potassium salt, as well as the ammonium salts, or the lower alkanolamine salts for example triethanolamine salt. The phosphonic acids or their water-soluble salts may be used singly or in mixtures thereof. Particularly suitable is a mixture of 1-hydroxyethane-1,1-diphosphonic acid and aminotrimethylene phosphonic acid in a weight ratio of 4:1 to 1:4.

The phosphonic acids or their water-soluble salts are added to the antimicrobial agents in such an amount that these agents contain per liter of the industrial water to be treated from 0.2 mgm up to 1.5 times the amount that is necessary for the complete sequestration of the hardness former ions found in the treated water.

It has been found that the above described combination of the phosphonic acid component with the biocide component has a number of advantages. The weight ratio between the phosphonic acid component and biocide component can vary between 1:10 and 10:1. Preferably, however, a weight ratio of 3:1 to 1:3 is used. The water to be treated with the agents according to the invention should have a content of phosphonic acid between 0.2 and 20 gm/m$^3$ and a content of biocide between 0.5 and 50 gm/m$^3$.

Suitable corrosion inhibitors include water-soluble orthophosphates, for example mono-, di- or trialkali metal orthophosphates. Furthermore water-soluble zinc salts, for example zinc sulfate or zinc nitrate can be used, which are added instead of the orthophosphates, but preferably simultaneously with the orthophosphates. Other inhibitors which can be added, if desired, are alkali metal nitrites, such as potassium nitrite or particularly sodium nitrite. An addition of alkali metal silicates, such as potassium silicate or sodium silicate is also possible. The inhibitors are added in amounts of from 0.5 to 200 mgm/liter, preferably 1 to 50 mgm/liter. The individual additives can be processed into solid mixtures. But it is also possible to produce solutions therefrom which are then added to the water in the desired amount. It is also possible to regulate the pH of these products, either by adding an alkali metal hydroxide, such as sodium hydroxide, or by selecting a suitable mono-, di-, or tri-alkali metal orthophosphate, so that a certain pH range of the treated water can be achieved at the same time.

The unexpected advantages of the combination of the above described biocides with the phosphonic acid components consist among others in the increased synergistic attack of the biocide on the biological material and the microorganisms. This leads to a very rapid degradation of their growth. The dispersing action of the phosphonic acids as well as their rust preventive effect are reciprocally enhanced by the biocide component. Due to the very low dosages both of the phosphonic acid component and of the biocide component, the outlet drain emits a minimum amount of these components. Due to the absorption of the biocide component by the biological material, the content of harmful substances discharged by the outlet drain is further decreased. In addition, the biocide component is biologically degradable after being discharged and correspondingly diluted.

The following examples are merely illustrative of the present invention without being deemed limitative in any manner thereof.

EXAMPLE 1

In order to test the antimicrobial and algicidal action, a number of reaction products first were produced according to the following method.

A mixture of dried $\epsilon$-caprolactam and N-alkyl-1,3-propylene diamine in the provided molar ratio was heated to 250°C while vigorously being stirred under an atmosphere of dry nitrogen. The mixture was then left standing at this temperature for 3 to 20 hours. After the reaction was completed, a vacuum was applied for one-half hour, in some cases, so as to distill off the unreacted N-alkyl-1,3-propylene diamine. The reaction products obtained were water-clear, thinly liquid melts which solidified after cooling to white solid bodies. These products were ground to powders without further purification and were used for the tests. Although products are difficulty soluble in water and organic solvents, their solubility is sufficient in regard of the small amounts which are necessary for this special use. In the following Table 1 are compiled the substances produced, identified by their alkyl radical, by the molar ratio of the reactants, by the reaction time in hours, by the vacuum applied in hours, if necessary, to remove unreacted diamine, and analytical data:

TABLE 1

| Substance | Alkyl radical | N-alkyl-1,3-propylene diamine ε-caprolactam ratio | Reaction time hours | Vacuum time hours | $N_{kj}$ % | $N_{titr.}$ % |
|---|---|---|---|---|---|---|
| A | Decyl | 1 : 3 | 20 | 0 | 12.26 | 4.25 |
| B | Dodecyl | 1 : 1 | 5 | 0.5 | 11.80 | 7.10 |
| C | Dodecyl | 1 : 1.5 | 5 | 0.5 | 11.68 | 6.10 |
| D | Dodecyl | 1 : 2 | 5 | 0.5 | 11.11 | 5.42 |
| E | Dodecyl | 1 : 2.5 | 5 | 0.5 | 11.01 | 4.81 |
| F | Dodecyl | 1 : 3 | 20 | 0 | 11.16 | 4.70 |
| G | Dodecyl | 1 : 4 | 5 | 0.5 | 11.67 | 3.72 |
| H | Dodecyl | 1 : 5 | 20 | 0 | 11.63 | 3.20 |
| J | Coconut fatty alkyl | 1 : 3 | 20 | 0 | 11.02 | 4.60 |
| K | Tetradecyl | 1 : 3 | 20 | 0 | 10.80 | 4.35 |
| L | Hexadecyl | 1 : 3 | 20 | 0 | 10.50 | 4.10 |
| M | Tallow fatty alkyl | 1 : 3 | 20 | 0 | 9.92 | 3.70 |
| N | Hardened tallow fatty alkyl | 1 : 3 | 20 | 0 | 10.11 | 3.84 |
| O | Octadecyl | 1 : 3 | 20 | 0 | 9.90 | 3.80 |

EXAMPLE 2

The antimicrobial activity of the reaction products of ε-caprolactam with N-alkyl-1,3-propylene diamines listed in Table 1 above was determined by measuring each product's inhibiting effect on the following test organisms:

1. *Staphylococcus aureus* 5 × $10^7$ organisms per ml
2. *Escherichia coli* 4 × $10^7$ organisms per ml
3. *Pseudomonas aeruginosa* 4 × $10^7$ organisms per ml
4. *Candida albicans* 2 × $10^6$ organisms per ml
5. *Aspergillus niger* 9 × $10^5$ organisms per ml
6. *Pencillium camerunense* 9 × $10^5$ organisms per ml
7. *Aerobacter aerogenus* 5 × $10^7$ organisms per ml The inhibiting concentrations of the individual substances were determined using the so-called "plate test". This test constitutes a modified form of the dilution test for determining the microbiostatic effect as described in the method for testing chemical disinfectants by the German Society for Hygiene and Microbiology (1959), under the methods of preliminary evaluations of such materials, and can be used to advantage in different tests not utilizing the liquid nutrient media stated in the said directives. The advantage of solid nutrient media is obvious, particularly when testing the efficacy of substances with respect to fungi.

The desired test concentrations were produced by mixing measured quantities of solutions of suitable concentrations of the test substances with measured quantitites of liquified brothagar or beer wort-agar in sterile Petri dishes. Merck Standard I broth-agar or wort-agar (8° Bg) was always used. The quantities of the substance solutions measured by means of a pipette were 0.1 ml, and the total volume in the Petri dishes amounted to 10 ml after mixing with the nutrient medium. After the nutrient medium had solidified, the surface was injected with the test suspension of organisms in broth or wort which contained the above-mentioned concentration of organisms per ml Incubation was effected for 3 days at 37°C for bacteria and was effected for 6 days at 30°C for fungi in an incubator. Subsequently it was determined which substance concentration incorporated in the nutrient medium could fully inhibit the growth of the organisms. The value thus determined was designated the "minimum inhibiting concentration" (m.i.c.). The tests were carried out in the following intervals of concentration:

5000 ppm, 2500 ppm, 1000 ppm, 750 ppm, 500 ppm, 250 ppm, 100 ppm, 50 ppm, 25 ppm, 10 ppm, 5 ppm and 1 ppm.

The results are compiled below in Table 2:

TABLE 2

Inhibiting concentration of the products A to O in ppm.

| Substance | Test Organism used | | | | | | |
|---|---|---|---|---|---|---|---|
| | 1 | 2 | 3 | 4 | 5 | 6 | 7 |
| A | 50 | —* | 250 | 250 | — | — | — |
| B | 10 | 10 | 10 | 100 | — | — | 10 |
| C | 10 | 10 | 10 | 50 | — | — | 10 |
| D | 10 | 10 | 10 | 50 | — | — | 10 |
| E | 10 | 10 | 50 | 50 | — | — | 10 |
| F | 5 | 10 | 50 | 25 | 100 | 100 | 10 |
| G | 10 | 10 | 50 | 100 | — | — | 10 |
| H | 5 | 10 | 100 | 1000 | — | — | 10 |
| J | 25 | 25 | 250 | 50 | 250 | 250 | — |
| K | 10 | 25 | 100 | 50 | 250 | 250 | — |
| L | 10 | 50 | 250 | 50 | — | — | — |
| M | 25 | 50 | 500 | 100 | 500 | 250 | — |
| N | 10 | 25 | 500 | 50 | 500 | 250 | — |
| O | 10 | 50 | 250 | 100 | — | — | — |

*"—" indicates that no tests were made.

The table indicates the unexpectedly superior inhibiting activity of the products according to the present invention against gram-positive bacteria, gram-negative bacteria and fungi.

EXAMPLE 2A

To determine the antimicrobial activity of the reaction products of ε-caprolactam with N-alkyl-1,3-propylene diamine, the inhibiting effect of substances B, F, J and K on some of the bacteria and fungi listed below, as well as on organisms in contaminated industrial water.

1. *Eschericia coli* 4 × $10^7$ organisms per ml
2. *Pseudomonas fluorescens* 4 × $10^7$ organisms per ml
3. *Aerobacter aerogenes* 5 × $10^7$ organisms per ml
4. *Fusarium spec.* 2 × $10^4$ organisms per ml
5. *cladosporium herbarum* 5 × $10^4$ organisms per ml
6. Mixture of contaminated industrial water from three cooling towers
7. Mixture of contaminated industrial water from three wash towers of air conditioning plants.

For comparison a commercial quarternary ammonium compound P, alkyl-$C_{10}$ to $_{14}$-dimethylbenzylammonium chloride was included in the test.

The inhibiting concentrations of the individual substances were determined by utilizing a procedure analogous to that described in Example 2, except as follows.

The tests were carried out in test tubes which were filled with Merck Standard broth or with beer wort (8° Bg) in a dilution of 1:5 with tap water. After adding the active substance, the nutrient solution volume in the test tube was 10 ml. Subsequently the tubes were inoculated with 0.1 ml of the test organism suspension. The inoculated tubes were incubated in the case of bacteria for 3 days at 37°C and in the case of fungi for 6 days at 30°C in the incubator. Subsequently it was determined which substance concentration added to the nutrient medium could just stop completely the growth of the germs. This value was called the minimum inhibiting concentration. The tests were carried out with the following concentration levels; and the results were compiled in the table as follows:

5,000 ppm, 2,500 ppm, 1,000 ppm, 750 ppm, 500 ppm, 250 ppm, 100 ppm, 50 ppm, 25 ppm, 10 ppm, 7.5 ppm, 5 ppm, 2.5 ppm, and 1 ppm.

TABLE 2A

| Substance | Inhibiting concentrations in ppm. Test organism or test product used | | | | | | |
|---|---|---|---|---|---|---|---|
| | 1 | 2 | 3 | 4 | 5 | 6 | 7 |
| B | 2.5 | 5 | 2.5 | 10 | 10 | 5 | 5 |
| F | 5 | 7.5 | 5 | 25 | 25 | 7.5 | 7.5 |
| J | 5 | 20 | 10 | 25 | 50 | 10 | 10 |
| K | 7.5 | 50 | 25 | 50 | 50 | 50 | 50 |
| P | 10 | 150 | 50 | 100 | 50 | 200 | 150 |

This table shows unexpectedly superior inhibiting effect of the active substances according to the invention.

EXAMPLE 3

The microcidal activity of many of the reaction products listed in Example 1 was determined by means of the suspension test. The procedure for this testing method is described in the method for the testing of chemical disinfectants published by the German Society for Hygiene and Microbiology (1959), under the methods of preliminary evaluations of such materials. According to these procedures 0.1 ml test organism suspension of the following bacteria and fungi were pipetted into test tubes at a temperature of 18° to 21°C.

1. Staphylococcus aureus $5 \times 10^7$ organisms per ml
2. Escherichia coli $4 \times 10^7$ organisms per ml
3. Pseudomonas aeruginosa $4 \times 10^7$ organisms per ml
4. Candida albicans $2 \times 10^6$ organisms per ml
5. Aspergillus niger $9 \times 10^5$ organisms per ml
7. Aerobacter aerogenus $5 \times 10^7$ organisms per ml Each 0.1 ml portion of the above test organism suspensions was diluted to 10 ml, first on the one hand with tap water containing the products of the invention to be tested (16° German hardness); and secondly on the other hand, in a solution buffered to pH of 10 (boric acid-potassium chloride-sodium hydroxide-buffer). The concentrations of the products according to the invention were 100 ppm and 250 ppm. After reaction times of 1, 2.5, 5, 10, 20, 30 and 60 minutes a dropper-full of material was taken from the test tubes and pipetted into 10 ml nutrient solution which contained 3% Tween 80 and 0.3% lecithin as de-inhibitors. The nutrient solutions inoculated with bacteria were incubated at 37°C, while those inoculated with fungi were incubated at 30°C, in an incubator. After 6 days the cultures were evaluated macroscopically for growth of the test organisms; and the sterilization times were then determined. The results are compiled in Table 3.

TABLE 3

Sterilization times of the products according to the invention with regard to the various test organisms, in minutes:

| Substance | Organism | in buffer pH 10 | | in tap water | |
|---|---|---|---|---|---|
| | | 100 ppm | 250 ppm | 100 ppm | 250 ppm |
| | | Times in minutes | | | |
| B | 1 | 1 | 1 | 1 | 1 |
| | 2 | 1 | 1 | 10 | 5 |
| | 3 | 2.5 | 1 | 5 | 1 |
| | 4 | 2.5 | 1 | 20 | 5 |
| | 7 | —* | — | 2.5 | 2.5 |
| C | 1 | 1 | 1 | 1 | 1 |
| | 2 | 2.5 | 1 | 20 | 2.5 |
| | 3 | 5 | 1 | 30 | 10 |
| | 4 | 2.5 | 2.5 | 5 | 2.5 |
| D | 1 | 1 | 1 | 2.5 | 1 |
| | 2 | 1 | 1 | 20 | 5 |
| | 3 | 5 | 2.5 | 20 | 10 |
| | 4 | 2.5 | 2.5 | 10 | 2.5 |
| | 7 | — | — | 10 | 2.5 |
| E | 1 | 1 | 1 | 2.5 | 1 |
| | 2 | 10 | 2.5 | 60 | 5 |
| | 3 | 5 | 1 | 30 | 10 |
| | 4 | 5 | 2.5 | 30 | 2.5 |
| F | 1 | 1 | 1 | 1 | 1 |
| | 2 | 5 | 2.5 | 5 | 1 |
| | 3 | 5 | 1 | 2.5 | 1 |
| | 4 | 2.5 | 2.5 | 1 | 1 |
| | 5 | 5 | 2.5 | 1 | 1 |
| | 7 | — | — | 20 | 5 |
| J | 1 | 1 | 1 | 2.5 | 1 |
| | 2 | 2.5 | 1 | 10 | 5 |
| | 3 | 1 | 1 | 30 | 5 |
| | 4 | 2.5 | 2.5 | 10 | 1 |
| | 5 | 5 | 5 | 30 | 20 |
| K | 1 | 5 | 5 | 10 | 10 |
| | 3 | 10 | 5 | 30 | 20 |
| | 4 | 5 | 2.5 | 10 | 5 |
| L | 1 | — | — | 2.5 | 2.5 |
| | 3 | — | — | 10 | 5 |
| | 4 | — | — | 2.5 | 2.5 |

*"—" indicates that no tests were made.

The foregoing table clearly indicates the unexpectedly superior sterilization activity of the reaction products according to the invention with regard to gram-positive bacteria, gram-negative bacteria and fungi.

EXAMPLE 4

The algae inhibiting activity of the products of the invention was determined by means of a dilution test. The test organisms were the following algae:

1. *Chlorella pyrenoidosa*
2. *Scenedesmus obliquus*

Test solutions of the products of the invention in concentrations of 50 ppm, 25 ppm, 20 ppm, 10 ppm, 7.5 ppm, 5 ppm, 2.5 ppm, 1 ppm and 0.5 ppm were pipetted into 200 ml petri dishes, and each was inoculated with a 5 ml suspension of the above algae and incubated for 4 weeks at 25°C. After 2 weeks an interim check was made and the inoculation was repeated with a 5 ml suspension of the algae which showed no growth in the dishes. The minimum inhibiting concentrations determined in the evaluation after 4 weeks are compiled in Table 4.

TABLE 4

Inhibiting concentrations of some products of the invention with regard to algae.

| Substance | Inhibiting concentration in ppm on alga 1 | on alga 2 |
| --- | --- | --- |
| F | 0.5 | 1 |
| J | 2.5 | 2.5 |
| K | 5 | 2.5 |
| M | 10 | 10 |
| N | 5 | 10 |

Thus Table 4 indicates that the reaction products of the invention have an unexpectedly superior inhibiting activity on algae.

EXAMPLE 4A

The inhibiting activity on algae was determined in cylindrical vessels under intensive aeration. Into the vessels were charged 100 ml of a nutrient solution mixed with increasing amounts of active substances and 4 ml of a mixed suspension of *Scenedesmus obliquus* and *Chlorella vulgaris*

The nutrient solution had the following composition:
| | |
| --- | --- |
| ammonium chloride | 0.1 gm |
| sodium nitrate | 1.0 gm |
| dipotassium hydrogen phosphate | 0.25 gm |
| crystalline magnesium sulfate | 0.5 gm |
| calcium chloride | 0.1 gm |
| ferric chloride | 0.003 gm | per 1000 ml of distilled water. The pH of the nutrient solution was 7.2. The tests were carried out with the following concentration levels of active substance: 10 ppm, 7.5 ppm, 5 ppm, 2.5 ppm, 2 ppm, 1.5 ppm, 1 ppm, 0.75 ppm, 0.5 ppm and 0.25 ppm. The minimum inhibiting concentrations determined in the tests after 7 days were compiled in Table 4A.

TABLE 4A

| Substance | Inhibition of the algae growth Inhibiting concentration in ppm |
| --- | --- |
| B | 0.5 |
| F | 0.75 |
| J | 1 |
| K | 2.5 |
| P | 1.5 |

Thus Table 4A indicates that the active substances according to the invention have an unexpectedly superior inhibiting activity on the growth of algae.

EXAMPLE 5

Inhibition of the growth of sulfate-reducing bacteria.

The inhibiting concentrations were determined in 50 ml bottles provided with a screwcap. The bottles were charged with an optimum nutrient solution for the growth of sulfate-reducing bacteria of the following composition: sodium lactate 4.0 gm, yeast extract 1.0 gm, ascorbic acid 0.1 gm, crystalline magnesium sulfate 0.5 gm, dipotassium hydrogen phosphate 0.2 gm, ammonium ferric alum 0.1 gm, sodium chloride 2 gm, per 1000 ml of distilled water. The pH of the nutrient solution was 7.4. After adding the active substances to be tested in the various concentrations, the mixture was inoculated with 1 ml of a pure culture of *Desulfovibrio desulfuricans* $6 \times 10^5$ oganisms per ml and then incubated for 4 weeks at 37°C in an incubator. The tests were carried out with the following concentration levels: 100 ppm, 50 ppm, 40 ppm, 30 ppm, 20 ppm, 20 ppm, 10 ppm, 5 ppm, 2.5 ppm, and 1 ppm.

In this test the following minimum inhibiting concentrations were determined for the various reaction products of the invention; and the results were compiled in Table 5:

TABLE 5

| Substance | Inhibition of the growth of *Desulfovibrio desulfuricans* Inhibiting concentration in ppm |
| --- | --- |
| B | 2.5 |
| F | 5 |
| J | 10 |
| P | 40 |

This test indicates the unexpectedly superior activity of the substances according to the invention.

EXAMPLE 6

In this test the foaming behavior of the active substances according to the invention were determined, along with that of the commercial substance P. The test was carried out according to the standardized test procedure of DIN 53,902. 200 ml of solutions of the substance to be tested in various concentrations were filled into a measuring cylinder so as to avoid any premature foaming. Then a foaming stamp struck the surface of the solution 100 times. One minute after the production of the foam had been completed, the foam volume above the liquid surface was read. The values obtained were compiled in Table 6.

TABLE 6

Determination of the foam volume as a function of the concentration of the active substance solutions.

| Substance | at 5 ppm | at 10 ppm | at 25 ppm | at 50 ppm | at 100 ppm |
| --- | --- | --- | --- | --- | --- |
| B | 0 | 0 | 10 | 20 | 50 |
| F | 0 | 0 | 15 | 20 | 60 |
| J | 0 | 0 | 10 | 25 | 50 |
| P | 5 – 10 | 25 | 50 | 100 | 400 |

Table 6 indicates the unexpectedly low foaming of the active substances according to the invention, compared to the commercial reference product.

EXAMPLE 7

The cooling cycle of a steam power plant with a volume of 6000 m$^3$ and an hourly supply of 150 m$^3$, as well as a circulation of 11,000 m$^3$/h having about three-fold concentration was treated for 6 months with a mixture of 1-hydroxyethane-1,1-diphosphonic acid and aminotrimethylene phosphonic acid in a weight ratio of 1:1. The amount of the mixture added was 4 gm/m$^3$. Despite a good anticorrosive action and the prevention of calcium deposition, serious difficulties always occurred and resulted from the growth on the condenser of slime-forming bacteria. Consequently an additional dose of 30 gm/m$^3$ of a commercial quaternary ammonium compound biocide which has been recommended for this purpose, was added. The result, however, was not satisfactory.

Then an agent according to the invention was utilized, which consisted of a mixture of 1-hydroxyethane-1,1-diphosphonic acid with aminotrimethylene phosphonic acid and a reaction product of equimolar amounts of ε-caprolactam and N-dodecyl-1,3-propylene diamine was used, for the water-treatment. The amount of the phosphonic acids added was 1.5 gm/m$^3$, while the amount of the biocide added was 2.5 gm/m$^3$. For 5 months difficulties were not experienced in the cooling cycle. Also there was no increase in the degree of hardness of the collant water, and there was no bacterial growth.

EXAMPLE 8

Utilizing a procedure analogous to that described in Example 7, the cooling cycle of a steam power plant was treated for a prolonged period of time with the mixture of phosphonic acids. Despite this treatment, slimy coatings were found after some time in the circulating system. An analysis showed that the coatings contained about 60% organic material and 18% calcium carbonate, as well as about 2% iron oxide. The system was then treated with a mixture which contained 1-hydroxyethane-1,1-diphosphonic acid and aminotrimethylene phosphonic acid in the form of the sodium salts and a reaction product of equimolar amounts of ε-caprolactam and N-coconut fatty alkyl-1,2-ethylene diamine. The weight ratio of the phosphonic acid component : biocide component was 1:2. The agent was added in an amount of 10 gm/m$^3$. Immediately at the start of the treatment the circulating water was analyzed for turbidity at certain time intervals in order to determine the effectiveness of the treatment. The following values obtained were reported in Table 7:

TABLE 7

| Time of day | | g/m$^3$ turbidity | |
|---|---|---|---|
| 8.00 | 1st day | 0.8 | starting value |
| 12.00 | | 4.2 | |
| 16.00 | | 9.7 | |
| 24.00 | | 9.3 | |
| 8.00 | 2nd day | 8.4 | |
| 12.00 | | 8.2 | |
| 16.00 | | 7.3 | |
| 10.00 | 3rd day | 5.4 | |
| 10.00 | 4th day | 3.0 | |
| 10.00 | 5th day | 1.2 | |

The results indicate that the turbidity increases at first because of the degradation of the biological growth, due to the microbiocidal action. Then the turbidity decreases constantly because no new coatings are formed.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. A process for the prevention of the growth of microorganisms in an aqueous environment which consists essentially of contacting said microorganisms with an amount effective to prevent the growth of said microorganisms of a reaction product of ε-caprolactam with an N-alkylalkylenediamine of the formula

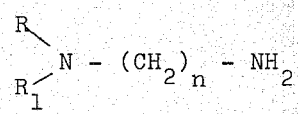

wherein R is selected from the group consisting of alkyl of 10 to 18 carbon atoms, hydroxyalkyl of 10 to 18 carbon atoms, alkenyl of 10 to 18 carbon atoms, hydroxyalkenyl of 10 to 18 carbon atoms, alkadienyl of 10 to 18 carbon atoms, alkatrienyl of 10 to 18 carbon atoms, and mixtures of alkyl derived from fatty acid mixtures of 10 to 18 carbon atoms, R$_1$ is a member selected from the group consisting of hydrogen and alkyl of 1 to 4 carbon atoms, and n is an integer from 2 to 6, with the molar ratio of N-alkylalkylenediamine to ε-caprolactam ranging from 1:1 to 1:10 and said reaction being carried out for 3 to 20 hours in the liquid phase at a temperature above 180°C.

2. The process of claim 1 in which said amount effective to prevent the growth of said microorganisms is from 0.1 to 500 parts per million by weight of said reaction product.

3. The process of claim 1 in which said microorganism is algae.

4. A process for the prevention of the growth of microorganisms in industrial water which comprises incorporating into said industrial water an antimicrobial effective amount of a reaction product of ε-caprolactam with an N-alkylalkylene diamine of the formula

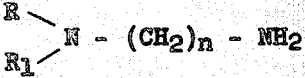

wherein R is selected from the group consisting of alkyl of 10 to 18 carbon atoms, hydroxyalkyl of 10 to 18 carbon atoms, alkenyl of 10 to 18 carbon atoms, hydroxyalkenyl of 10 to 18 carbon atoms, alkadienyl of 10 to 18 carbon atoms, alkatrienyl of 10 to 18 carbon atoms, and mixtures of alkyl derived from fatty acid mixtures of 10 to 18 carbon atoms, R$_1$ is a member selected from the group consisting of hydrogen and alkyl of 1 to 4 carbon atoms, and n is an integer from 2 to 6, with the molar ratio of N-alkylalkylene diamine to ε-caprolactam ranging from 1:1 to 1:10 and said reaction being carried out for 3 to 20 hours in the liquid phase at a temperature above 180°C.

5. The process of claim 4 in which said antimicrobial effective amount of said reaction product is from 0.5 to 50 mgm/liter.

6. The process of claim 4 in which said antimicrobial effective amount of said reaction product is from 1 to 10 mgm/liter.

7. The process of claim 4 in which R is alkyl of 12 to 14 carbon atoms, $R_1$ is hydrogen, and with the molar ratio of N-alkylalkylene diamine to ε-caprolactam ranging from 1:1 to 1:5.

8. The process of claim 7 in which $n$ is 3, with the molar ratio of N-alkylalkylene diamine to ε-caprolactam ranging from 1:1 to 1:3.

9. The process of claim 8 in which said reaction product consists of dodecyl-1,3-propylene diamine and ε-caprolactam in the molar ratio of 1:1.

10. The process of claim 8 in which said reaction product consists of dodecyl-1,3-propylene diamine and ε-caprolactam in the molar ratio of 1:3.

11. The process of claim 8 in which said reaction product consists of coconut fatty alkyl-1,3-propylene diamine and ε-caprolactam in the molar ratio of 1:3.

12. The process of claim 8 in which said reaction product consists of tetradecyl-1,3-propylene diamine and ε-caprolactam in the molar ratio of 1:3.

13. The process of claim 8 in which said reaction product consists exclusively of the reaction product of ε-caprolactam with N-alkylalkylene diamine, and said reaction is carried out at a temperature of about 250°C in the liquid phase.

14. The process of claim 4 in which said microorganism is algae.

15. The process of claim 4 in which $R_1$ is hydrogen, $n$ is 3, and R is selected from the group consisting of decyl, dodecyl, coconut fatty alkyl, tetradecyl, hexadecyl, tallow fatty alkyl, hardened tallow fatty alkyl and octadecyl, with the molar ratio of N-alkylalkylene diamine to ε-caprolactam ranging from 1:1 to 1:5.

16. The process of claim 4, in which $R_1$ is hydrogen, n is 2, and R is coconut fatty alkyl.

* * * * *